United States Patent
Miller et al.

(10) Patent No.: US 6,545,874 B1
(45) Date of Patent: Apr. 8, 2003

(54) ULTRA COMPACT COMPUTER ARRANGEMENT

(75) Inventors: Wayne H. Miller, Los Altos, CA (US); Ricardo Alba Mariano, Hayward, CA (US); Steven Thomas Holmes, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/880,676

(22) Filed: Jun. 13, 2001

(51) Int. Cl.[7] .............................. H05K 5/00; H05K 5/04; H05K 5/06
(52) U.S. Cl. .................. 361/752; 361/753; 361/704; 361/707; 361/709; 361/796; 361/683; 361/684; 361/685
(58) Field of Search .................. 361/752, 753, 361/796, 695, 702, 703, 709, 683, 684, 685, 704, 707, 728

(56) References Cited

U.S. PATENT DOCUMENTS

| | | | | |
|---|---|---|---|---|
| 3,925,710 A | * | 12/1975 | Ebert | 317/100 |
| 5,398,161 A | * | 3/1995 | Roy | 361/727 |
| 5,708,751 A | * | 1/1998 | Mattei | 385/135 |
| 5,825,621 A | * | 10/1998 | Giannatto et al. | 361/701 |
| 6,084,774 A | * | 7/2000 | Talbot et al. | 165/185 |
| 6,134,107 A | * | 10/2000 | Kerrigan et al. | 361/694 |
| 6,157,540 A | * | 12/2000 | Eddings et al. | 361/727 |
| 6,185,097 B1 | * | 2/2001 | Behl | 361/695 |

* cited by examiner

Primary Examiner—David Martin
Assistant Examiner—Thanh Y. Tran
(74) Attorney, Agent, or Firm—Burns, Doane, Swecker & Mathis, LLP

(57) ABSTRACT

A cubical computer housing assembly comprises first and second ends and four sides, which define an interior compartment for housing the various computer components. The first and second ends are rigidly connected to one another and are slidingly detachable from four sides of the assembly. The interior compartment comprises three parallelepiped portions, one for accommodating a plurality of circuit boards, one for accommodating a heat sink and hard disk drive, and one for accommodating other memory device such as a CD ROM or DVD player. A hard disk drive is slidingly mounted in a frame which is rigidly mounted relative to the first and second ends. A hinged door on which is mounted a printed circuit board can be moved to an open position to provide access to the disk drive for removal and replacement of same.

16 Claims, 3 Drawing Sheets

ULTRA COMPACT COMPUTER ARRANGEMENT

CROSS-REFERENCE TO RELATED APPLICATIONS (Not applicable)

BACKGROUND OF THE INVENTION

1. Field of the Invention

The present invention relates to computer arrangements, and more particularly, to a compact computer arrangement in which components are disposed within an exterior computer housing with maximized space efficiency while at the same time remaining relatively accessible.

2. Description of Related Art

Conventionally, computer components, such as those of "desktop" computers, are disposed within an exterior housing such that various PC boards (PCBs) are stacked one over the other in a generally horizontal manner within the housing. Depending on the system requirements and specifications, heat generation and EMI (electromagnetic interference) are controlled using for example suitable conductive shields. Further, electric are used to dissipate heat from sensitive components. The fans take up valuable space within the housing, increase costs and noise, and are particularly susceptible to failure due to their mechanical nature. The fans and heat sink also complicate the general layout of the components within the housing, hampering access to PCBs that may need to be repaired or replaced, for example during an upgrade of the computer. To resolve these problems, conventional arrangements have relied on a less compact layout, such that components, while taking up more space than necessary, at least remain accessible for purposes of an upgrade for example. Of course, this comes with the expense of increased size and inefficiency.

BRIEF SUMMARY OF THE INVENTION

In accordance with the invention, an arrangement for a computer having a plurality of circuit boards, a heat sink, a hard disk drive, and one or more memory storage devices comprises a housing defining an interior compartment including first, second and third parallelepiped portions. The first, second and third parallelepiped portions accommodate, respectively, the plurality of circuit boards, the heat sink, and the one or more memory storage devices.

Further in accordance with the invention, a desktop computer is provided with comprises a housing having a plurality of sides defining a compartment therein, a frame removably mounted in said compartment, a replaceable computer component slidably mounted to said frame, and a hinged door having an open position and a closed position. In the closed position, the hinged door prevents access to the replaceable computer component, while in the open position the hinged door permits access to the replaceable computer component such that replacement of the replaceable computer component can be effected when the hinged door is in the open position.

Further in accordance with the invention, a desktop computer assembly is provided which comprises a housing having four sides and first and second ends, the first and second ends being rigidly mounted to one another and being slidably detachable from the four sides. A frame which is rigidly mounted relative to the first and second ends is also provided, and a computer component is slidingly mounted in the frame. A door is mounted in a stationary position relative to the first and second ends but is movable between an open position and a closed position, the door in the open position providing access to the computer component such that movable component can be slidingly removed from the frame.

BRIEF DESCRIPTION OF THE SEVERAL VIEWS OF THE DRAWING

Many advantages of the present invention will be apparent to those skilled in the art with a reading of this specification in conjunction with the attached drawings, wherein like reference numerals are applied to like elements and wherein.

DETAILED DESCRIPTION OF THE INVENTION

Figure 1:
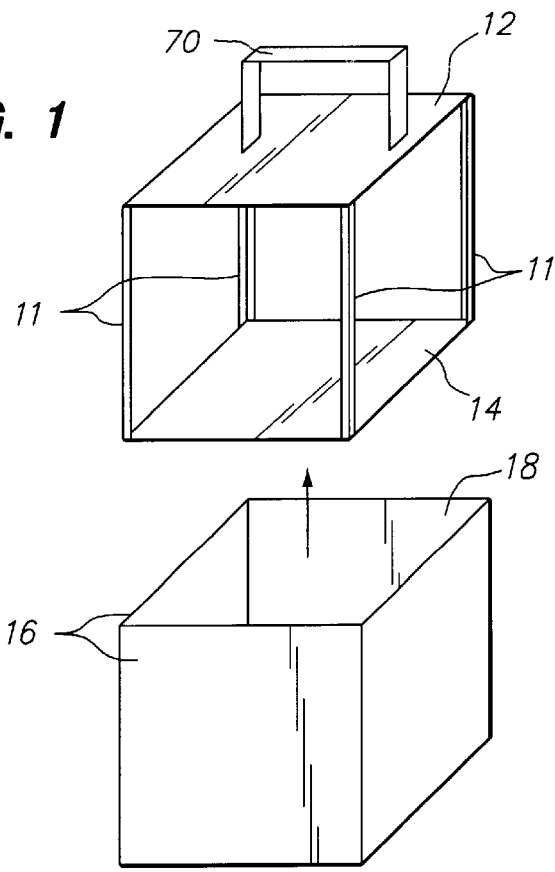
FIG. 1 is a perspective view of the housing in accordance with the invention.

FIG. 1 shows a housing 10 for a computer, for example a desktop computer, in accordance with the invention. Housing 10, which is preferably substantially cubical in shape, has removable first (12) and second (14) ends and four sides 16. The first (12) and second (14) ends and sides 16 serve to define an interior compartment 18 in which various computer components are housed. The first (12) and second (14) ends are rigidly connected to one another, for example by supports 11, and their removal from sides 16 is effected using a retractable handle 70.

Figure 1A:
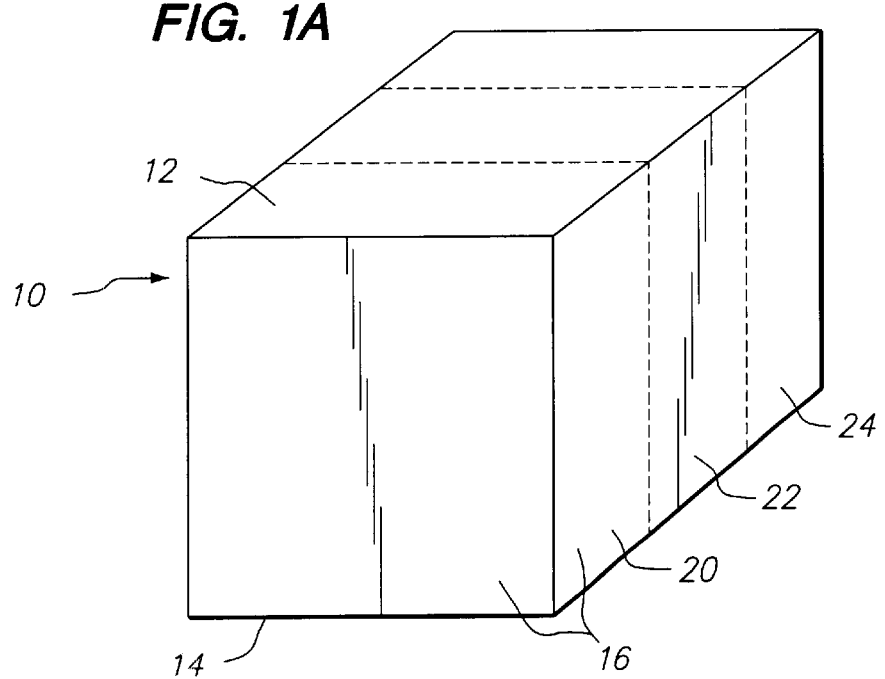
FIG. 1A is a schematic view of the portions of the interior of the housing in accordance with the invention.
Figure 2:
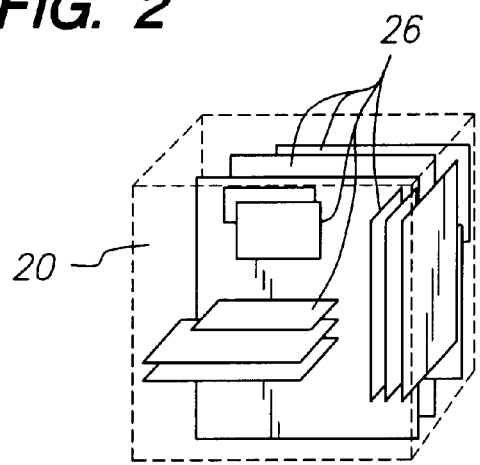
FIG. 2 is a schematic view of a first side portion in accordance with the invention.

As seen from FIG. 1A, compartment 18 can be considered as defining three parallelepiped portions 20, 22 and 24. First side portion 20, shown in FIG. 2, contains the various printed circuit boards 26 of the desktop computer, arranged in a compact configuration, such that some of these PCBs are stacked vertically and in parallel or perpendicular relation to one another, while others are stacked horizontally. Second side portion 24 is dedicated to memory storage devices such as a DVD drive CD ROM, or a floppy disk drive.

Figure 3:
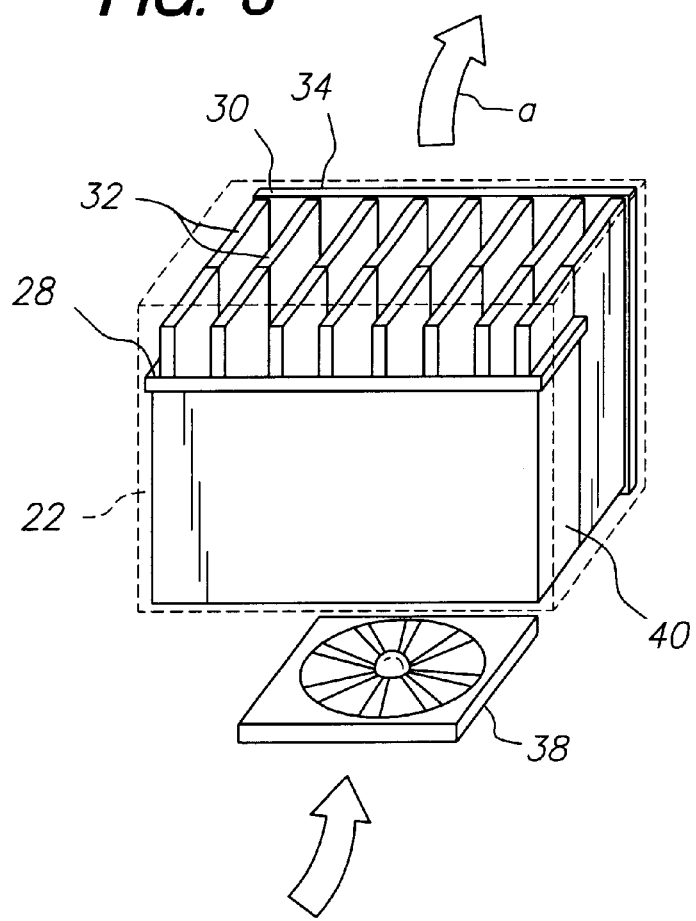
FIG. 3 is a schematic perspective view of a central portion in accordance with the invention.

Central portion 22 is shown in detail in FIG. 3. Central portion 22 is occupied principally by heat sinks 28 and 30 and hard disk drive 40. Heat sink 30 comprises a plurality of vertically extending fins 32 which are supported at one edge by vertically mounted base 34. Fins 32 define slots therebetween which preferably extend the entire height of compartment 18, from first end 12 to second end 14, and thereby form a chimney-type channel through which circulating air (a) can flow in a heat convection cooling process. The ends of this channel substantially coincide with ends of 12 and 14, and to facilitate air flow, ends 12 and 14 can be provided with perforations or other openings (not shown) through which air can enter or exit the channel. Optionally, a fan 38 can be placed along the channel to force air therethrough and create a convection air stream, with the fan preferably being mounted at either one of ends 14 and 16 within compartment 18. Obviously, clearance for such a fan would have to be provided between the end face (14, 16) and the heat sink 30. Heat sink 30 is arranged such that base 34 thereof abuts portion 20 in which the various PCBs are disposed. To exploit its heat dissipation capacity, heat sink 30 is preferably in thermal contact with the computer CPU card layer and a main logic board card layer (not shown) in portion 20, preferably through a heat spreader (not shown) adapted for this purpose.

Figure 4:
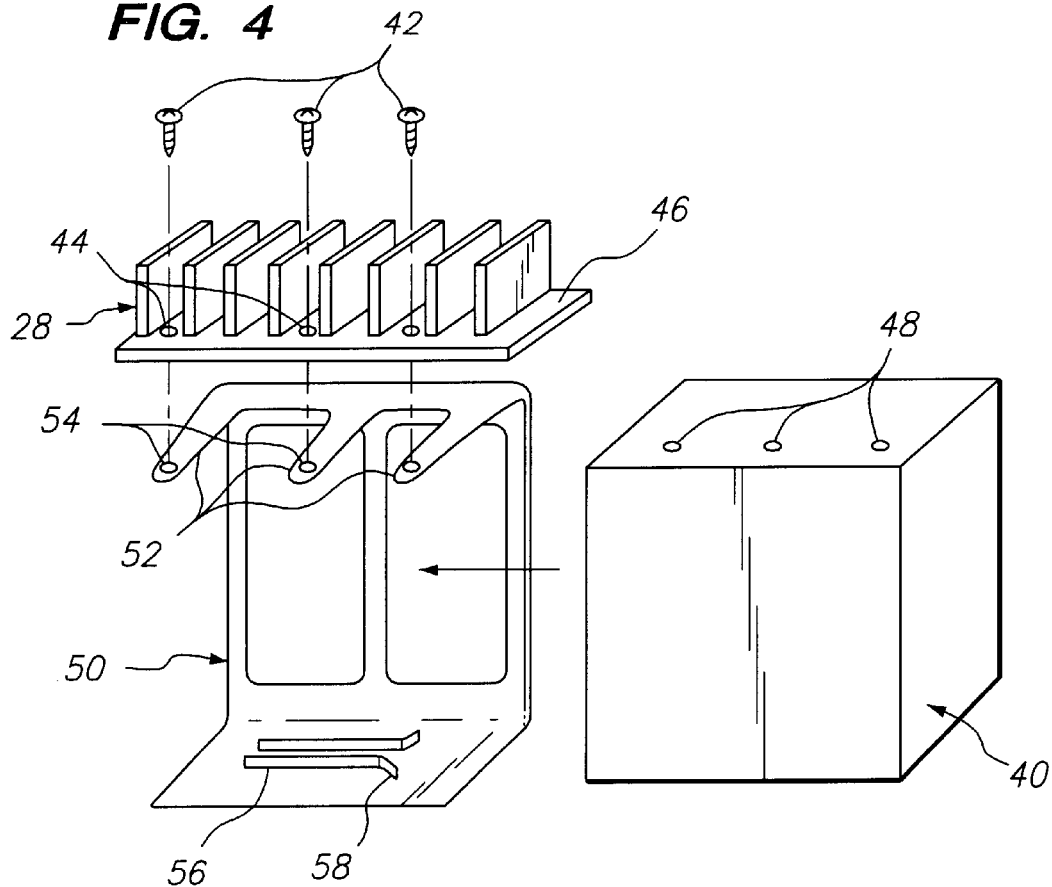
FIG. 4 is a schematic perspective view of the sliding mounting arrangement of a hard disk drive in accordance with the invention.

Heat sink 28 is mounted to hard disk drive 40, for example using fasteners such as screws 42, shown in FIG. 4, which pass through matching holes 44 in base 46 of heat sink 28 to screw into corresponding holes 48 provided in the hard disk drive. This mounting is facilitated by a frame 50, which is provided with extensions 52 having holes 54 formed therein. Holes 54 are in registry with holes 44 and 48. Frame 50 is rigidly supported with respect to the removable first (12) and second (14) ends of computer housing 10. A guide track 56 is provided in frame 50 for mating with a suitable portion such as a rail (not shown) formed on hard disk drive 40 in order to align the hard disk drive in frame 50. Guide track 56 is provided with a flared portion 58 to facilitate entry of the rail of hard disk drive 40 thereinto when the hard disk drive is replaced.

Figure 5:
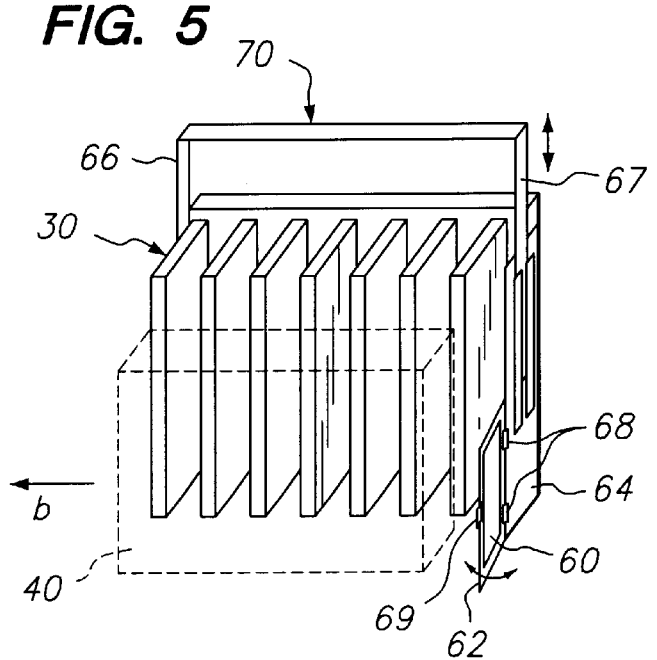
FIG. 5 is a schematic perspective view of a hinged door arrangement in accordance with the invention.

Replacement of hard disk drive 40 is further facilitated using a novel hinged mounting arrangement for components of the computer, and particularly circuit boards, disposed along the side edges of hard disk drive 40. Such a circuit board is PCMCIA card 60, shown in FIG. 5, which is mounted on hinged door 62 having a latch 69 for latching the hinged door in a closed position or for permitting its opening when unlatched such that access to hard disk drive 40 can be gained. PCMCIA card 60 is pluggably mounted in door 62. The hinged mounting of door 62 is with respect to rigid frame 64 to which hinges 68 are secured. Frame 64 is rigidly mounted to removable ends 12 and 14 of housing 10 and supports various components, including heat sink 30 and arms 66 and 67 of retractable handle 70. Arms 66 and 67 pass through suitable openings (not shown) provided in end 12 and are used to gain access to the contents of compartment 18 by pulling ends 12 and 14, along with frame 64 and other supported components (not shown), apart from sides 16. Once these are apart, door latch 69 can be unlatched, permitting opening of door 62 such that hard disk drive 40 can be made to slide in frame 50 for removal thereof in order to service the hard disk drive or replace it in a computer upgrade. The sliding of hard disk drive 40 can be in the direction of door 62. Preferably, however, this sliding is away from door 40, in the direction of arrow b, with the opening of door 62 merely enabling the application of force to the side of hard disk drive 40 so that the hard disk drive can be pushed away from the door and extracted from the other side of the assembly.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. An arrangement for a computer having a plurality of circuit boards, a heat sink, a hard disk drive, and one or more memory storage devices, the arrangement comprising:
   a plurality of supports;
   a housing defining an interior compartment including first, second and third distinct parallelepiped portions having substantially equivalent orientations within the interior compartment, the first, second and third parallelepiped portions accommodating, respectively, the plurality of circuit boards, the heat sink, and the one or more memory storage devices such that the heat sink is disposed between the plurality of circuit boards and the one or more memory storage devices;
   the housing further having an interior compartment defined by four sides, a top end, and a bottom end, the top and bottom ends being rigidly mounted to one another by said plurality of supports and being vertically slidably detachable from the four sides, said supports extending between the top and bottom ends and being separated from one another by one or more spaces through which access to the interior compartment can be gained when the top and bottom ends are detached from the four sides.

2. The arrangement of claim 1, wherein the housing is substantially cubical in shape.

3. The arrangement of claim 1, wherein the second parallelepiped portion accommodates the hard disk drive.

4. The arrangement of claim 1, wherein the heat sink defines a vertical channel for passage of a convection air stream.

5. The arrangement of claim 4, wherein the channel is in communication with a fan for impelling the convection air stream.

6. The arrangement of claim 1, wherein the hard disk drive is slidably mounted in the second parallelepiped portion.

7. The arrangement of claim 1, further comprising a hinged door and a circuit board mounted to the hinged door, the hinged door having an open position and a closed position, wherein in the open position the hard disk drive can be accessed through the hinged door.

8. A desktop computer having a plurality of circuit boards, a heat sink, a hard disk drive, and one or more memory storage devices, the desktop computer comprising:
   a housing having a plurality of sides defining a compartment therein, said interior compartment including first, second and third distinct parallelepiped portions having substantially equivalent orientations within the interior compartment and accommodating, respectively, the plurality of circuit boards, the heat sink, and the one or more memory storage devices such that the heat sink is disposed between the plurality of circuit boards and the one or more memory storage devices;
   a frame removably mounted in said compartment;
   a replaceable computer component slidably mounted to said frame; and
   a hinged door having an open position and a closed position, the hinged door preventing access to the replaceable computer component when in the closed position and permitting access to the replaceable computer component when in the open position, such that replacement of the replaceable computer component can be effected when the hinged door is in the open position.

9. The desktop computer of claim 8, further including a printed circuit board mounted to said hinged door.

10. The desktop computer of claim 9, wherein the printed circuit board is removably mounted to said hinged door.

11. The desktop computer of claim 10, wherein the printed circuit board is a removable PCMCIA card.

12. The desktop computer of claim 8, wherein the replaceable computer component is further supported in said frame by one or more removable fasteners.

13. The desktop computer of claim 12, further including a heat sink connected by said fasteners to said frame.

14. A desktop computer assembly comprising:

a plurality of supports;

housing having an interior compartment defined by four sides, a top end, and a bottom end, the top and bottom ends being rigidly mounted to one another by said plurality of supports and being vertically slidably detachable from the four sides, said supports extending between the top and bottom ends and being separated from one another by one or more spaces through which access to the interior compartment can be gained when the top and bottom ends are detached from the four sides.

a frame rigidly mounted relative to the top and bottom ends;

a computer component slidingly mounted in the frame; and a door mounted in a stationary position relative to top and bottom ends and being movable between an open position and a closed position, the door in the open position providing access to the computer component such that the movable component can be slidingly removed from said frame.

15. The desktop computer assembly of claim 14, further comprising a printed circuit board mounted to the door.

16. The desktop computer assembly of claim 14, further comprising a latch for retaining the door in the closed position.

* * * * *